United States Patent [19]

Mecke et al.

[11] Patent Number: 5,597,633
[45] Date of Patent: Jan. 28, 1997

[54] TRANSFER ADHESIVE TAPE

[75] Inventors: Norbert Mecke, Hanover; Lothar Titze, Uetze, both of Germany

[73] Assignee: Pelikan GmbH, Hanover, Germany

[21] Appl. No.: 387,012

[22] Filed: Feb. 10, 1995

Related U.S. Application Data

[63] Continuation of Ser. No. 180,532, Jan. 12, 1994, abandoned, which is a continuation of Ser. No. 978,939, Nov. 18, 1992, abandoned.

[30] Foreign Application Priority Data

Nov. 18, 1991 [DE] Germany .......................... 41 37 936.5

[51] Int. Cl.$^6$ ........................................................ C09J 7/02
[52] U.S. Cl. ................... 428/41.5; 428/343; 428/355 EN
[58] Field of Search ............................... 428/40, 343, 352, 428/354, 355, 356, 914

[56] References Cited

U.S. PATENT DOCUMENTS

| | | | |
|---|---|---|---|
| 3,741,786 | 6/1973 | Torrey | 428/195 X |
| 4,074,004 | 2/1978 | Bateson et al. | 428/483 X |
| 4,241,198 | 12/1980 | Kobayashi | 428/352 X |
| 4,335,171 | 6/1982 | Zenk | 428/343 X |
| 4,624,893 | 11/1986 | Shibano et al. | 428/354 X |
| 4,859,511 | 8/1989 | Patterson et al. | 428/40 |
| 5,185,212 | 2/1993 | Spada et al. | 428/442 X |

FOREIGN PATENT DOCUMENTS

| | | |
|---|---|---|
| 0063898 | 3/1982 | European Pat. Off. . |
| 0279118 | 8/1988 | European Pat. Off. . |
| 976082 | 3/1951 | France . |
| 3835783 | 4/1990 | Germany . |
| 2008000 | 5/1979 | United Kingdom . |

OTHER PUBLICATIONS

Merck Index, 11th Ed. Compounds 231, 232.
Rompps Chemie–Lexikon, pp. 104–13 105, Dr. Otto–Albrecht Neumuller no translation.

*Primary Examiner*—Jenna Davis
*Attorney, Agent, or Firm*—Herbert Dubno; Jonathan Myers

[57] ABSTRACT

In order to promote tearing in a clean line of an adhesive film applied by a hand-held device to a substrate by unrolling an adhesive tape from a roller, pressing the tape against the substrate and winding up the carrier of the tape after the adhesive film is stripped therefrom, alginic acid in finely divided form is provided in the adhesive film.

1 Claim, 1 Drawing Sheet

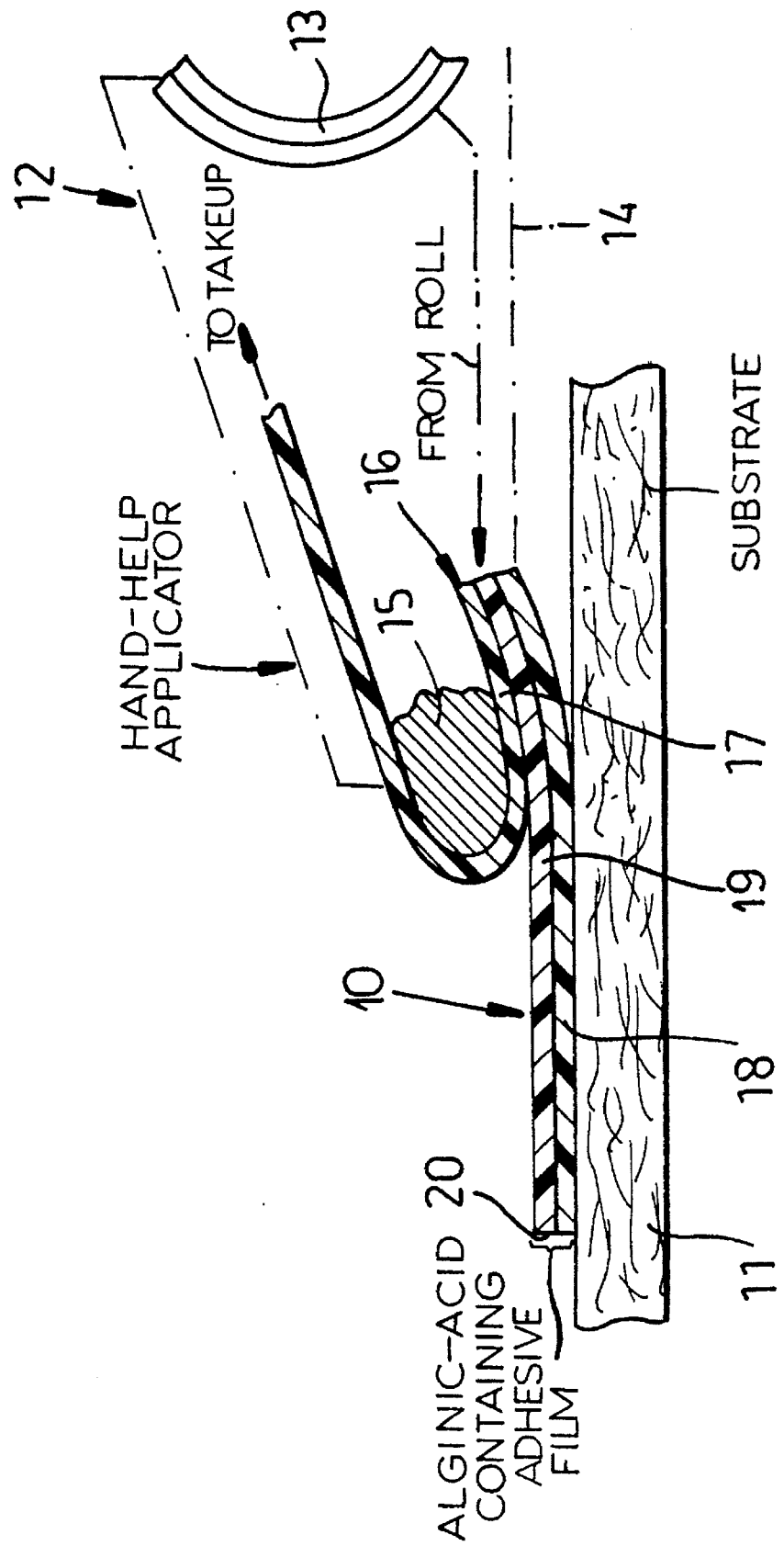

TRANSFER ADHESIVE TAPE

This is a continuation of application Ser. No. 08/180,532 filed on 12 Jan. 1994 now abandoned which is a continuation of Ser No. 07/978,939 filed 18 Nov. 1992 now abandoned.

CROSS REFERENCE TO RELATED APPLICATION

This application is related to the commonly assigned copending applications Ser. No. 07/582,111, filed 12 Sep. 1990 and Ser. No. 07/765,659, filed 25 Sep. 1991 now U.S. Pat. No. 5,240,495 issued 31 Aug. 1993.

BACKGROUND OF THE INVENTION

1. Field of the Invention

Our present invention relates to a transfer adhesive tape of the type in which a carrier is provided with a contact-adhesive film which can be released from the carrier upon pressing of the adhesive layer against a substrate so that the adhesive layer will remain on the substrate and can be used to bond another surface thereto. More particularly, the invention relates to a transfer adhesive tape of this type wherein the adhesive film released by the carrier is a pressure sensitive adhesive of an acrylate base. The invention also relates to the production of such a transfer adhesive tape and to the use thereof in a hand held applicator.

2. Background of the Invention

Transfer adhesive tapes of the aforedescribed type have been provided heretofore and can be paid out from a roll of the adhesive tape in a hand held device which presses the tape against a substrate and thereby affects a transfer of the adhesive film to that carrier as the tape is wound back up on a take up roll of the device.

An apparatus of this type is described in EP 0 267 396 (see also U.S. Pat. No. 4,849,064, issued 18 Jul. 1989, U.S. Pat. No. 5,006,184, issued 9 Apr. 1991 and U.S. Pat. No. 5,125,589, issued 30 Jun. 1992).

The device comprises a housing in which a supply spool is provided for a carrier tape coated with the adhesive film, a take up roller for receiving the carrier tape after the adhesive film has separated therefrom, and a guide arrangement for deflecting the tape from the supply spool to the take up roll and supporting the tape at a location outside the housing at which the adhesive film coating side of the tape is disposed on the outside of the housing and can be transferred to the substrate.

Between the supply spool and the take up roll, a drive mechanism is provided which rotates the take up spool in step with the advance of the supply spool so that the support tape is continuously tensioned. In this manner, the adhesive film is released from the support tape and left adherent to the substrate. A further substrate, such as a piece of paper, can be applied to the adhesive coated surface thus produced.

Depending upon the type of adhesive film or its chemical composition, a permanent bond can be provided or lesser adhesion forces can be generated to enable the second substrate to be lifted from the first to which the adhesive strip can remain adherent.

In the adhesive film applications described above it has been found that the desired smooth tearing of the film when the device is moved away from the substrate, does not always result. In some cases, the separation of the film applied to the substrate and the device holding the transferring adhesive tape is so irregular that threads of adhesive are formed and create problems. A solution to this problem has not been devised previously.

In German Patent 22 25 618, for example, the problem has been unsuccessfully attacked by dividing the adhesive into segments on the tape so that tearing of the film can be avoided and thus separation of the film does not pose a problem in the first place.

OBJECTS OF THE INVENTION

It is the principal object of the present invention to provide a transfer adhesive tape which ensures a clean tearing of the adhesive film, especially when the transfer adhesive film is applied using a hand held applicator of the aforedescribed type.

It is also an object of the invention to provide an improved method of making a transfer adhesive tape with the ability of the film to separate without the formation of strings or the like.

Yet another object of the invention is the promotion of an improved hand held device for the application of a transfer adhesive whereby problems of prior art systems are avoided.

SUMMARY OF THE INVENTION

We have found, quite surprisingly, that the problem of clean separation of the adhesive film can be avoided by incorporating in the pressure sensitive adhesive of the film an effective amount of alginic acid. The term "effective amount" is here used to refer to anything greater than a trace amount which is capable of bringing about clean or sharp separation of the film on tearing while maintaining the self-adhesive, pressure adhesive or contact adhesive qualities of the film.

The carrier, according to the invention is preferably a synthetic resin foil and can be a carrier of the type used in typewriting machine tapes or ribbons. It thus may be composed of polyethyleneterephthalate, polypropylene, polyethylene, polyvinylchloride or polycarbonate. One or both sides of the plastic foil can be provided with a silicone coating capable of reducing the adhesion between the adhesive film and the carrier foil. The carrier may also be a silicone coated paper. Here as well the silicone coating affords a reduction in the adhesion with which the adhesive film is held to the carrier. However, other antiadhesion agents, such as polytetrafluoroethylene, can be used as well.

The carrier preferably has a thickness of 10 to 60 micrometers, especially between 15 and 55 micrometers while the adhesive film preferably has a thickness of about 5 to 40 micrometers, especially 15 to 25 micrometers.

The adhesive film of the transfer adhesive tape or ribbon of the present invention is an acrylate-based adhesive. This term is used in its broadest possible sense thus, the term includes a polyacrylate, a polymethacrylate and also acrylate or methacrylate copolymers. These are described, for example, in Römpps Chemie-Lexikon, Vol. 5, Page 3274 and include polyacrylates, polymethacrylate, and copolymers of acrylic and methacrylic esters, (e.g. with monomens such as styrene, vinyl chloride, vinyl acetate and acrylonitrile). Copolymers of an acrylate/methacrylate basis are also suitable. Preferred of the acrylate materials are copolymers of methyl acrylate with butyl acrylate. This resultant films provide an elastic permanent self adhesive mass of high adhesion force which can bond with a minimum amount of applied pressure at room temperature to a variety of substrate surfaces.

It is possible to provide the carrier with two or more adhesive coatings having different adhesion properties. For example, a lower layer of such adhesion force that it will bond permanently to the substrate while the upper layer has a reduced adhesion force so that it will bond to the second substrate but allow that substrate to be removed. In this case, the alginic acid can be provided in one adhesive layer or in both adhesive layers. This system has been found to be highly advantageous for the temporary bonding of a second substrate to the first.

The adhesive film of the transfer adhesive tape or ribbon according to the invention can be provided with a variety of property-improving additives as, for example, preservatives, coloring agents or pigments to color the adhesive film. The coloring agents and/or pigments or dyestuffs can also have plastics character and can be in the form of synthetic resins.

According to the method aspect of the invention, a method of making the transfer adhesive tape comprises reacting an aqueous dispersion of an acrylate-based adhesive with an alginate dissolved in water and stirring the resulting aqueous mixture and acidifying the stirred mixture so that alginic acid precipitates in a finely divided form. The resulting adhesive dispersion is applied to a flexible carrier in the conventional manner and the aqueous phase is evaporated off. The preferred alginates are sodium and potassium alginate. The alginate is added to the adhesive dispersion so that the finished adhesive film contains about 0.5 to 10% by weight alginic acid, preferably 1 to 5% by weight. Adjustment of the acidity of the system can be effected with hydrochloric acid, sulfuric acid or the like. During adjustment of the acidity to a pH value of about 2 to 3, the alginate is converted to alginic acid and that is stirred with a propeller stirrer or the like to yield a fine dispersion of the alginic acid in the aqueous adhesive dispersion. The finer the distribution of the alginic acid in the dispersion, the better is the effect with respect to sharp separation with the film on tearing.

The water can be evaporated from the dispersion by passing air heated to a temperature of about 100° C., over the dispersion coating. The alginic acid containing aqueous adhesive dispersion which, upon application to the carrier forms the adhesive film, is preferably applied to the carrier in an amount of about 10 to 80 g/m$^2$, especially about 20 to about 30 g/m$^2$, in terms of the dry substance content of the dispersion.

To optimize the coating process, auxiliary coating agents may be incorporated in the aqueous adhesive dispersion. These can include wetting agents, especially nonionic surfactants like ethoxylated nonylphenol. We can also introduce into the dispersion additives which will impart to the finished adhesive layer appropriate properties. These can include, for example, the preservatives mentioned earlier.

The important ingredient for clean separation, i.e. separation of the adhesive film along a line without string formation upon tearing, is the alginic acid. Without the alginic acid a clean tear cannot be obtained. With the alginic acid, practically independently of the nature of the substrate, we are able to obtain a clean tear. The substrates can be glass, wool, metallic surfaces and the like, but also paper, plastics and similar materials.

While in the past it has been proposed to perforate the adhesive film to promote clean tear or to introduce granular fillers which can be provided in addition to the perforation, we have found that neither a perforation nor the use of granular fillers is necessary any long to obtain the clean tear.

The transfer adhesive ribbon or tape of the invention is preferably provided in a rolled up form. Tape can be applied with one of the hand-held applicators described above from which the transfer adhesive tape is unrolled with the adhesive film, is contacted with the substrate and the carrier is then wound up again. The takeup of the carrier affords a particularly clean application process and the use of the hand roller, which can be shaped to fit conveniently into the hand of the user, provides a particularly effective film application.

The drive within the housing of the applicator ensures that sufficient tension will be maintained on the transfer adhesive strip or band to allow the application of the film with one hand and to ensure the clean tear.

The user takes hold of the housing of the applicator and presses the film with the applicator foot against the substrate. A free end of the film at this applicator foot is thereby bonded to the substrate and as the applicator is drawn along the surface, a length of the film is applied thereto with the support being drawn away to form the applied film.

When the desired length of adhesive has been applied, the device is moved away from the substrate to form the clean tear. The transfer adhesive tape of the invention can be used inter alia for mounting photographs, bonding paper, cardboard and wood and in the household, the office and in woodworking. Of course there are many other fields of use.

BRIEF DESCRIPTION OF THE DRAWINGS

The above and other objects, features and advantages of my invention will become more readily apparent from the following description, reference being made to the sole FIGURE of the accompanying drawing which is a diagrammatic cross sectional view illustrating the invention.

SPECIFIC DESCRIPTION

In the drawing, we have shown to a scale somewhat greater than true scale, the application of a two layer adhesive film 10 to a substrate 11 utilizing an applicator 12 which can include a supply roll 13 within the applicator housing 14 represented in dot-dash lines. The applicator can have any of the configurations described in the aforementioned patents and can have a pressure member or foot 15 which applies the tape 16 to the substrate 11.

The tape 16 comprises, in addition to the adhesive layer 10, a synthetic resin foil 17 forming the carrier. The adhesive film 10 can have a lower layer 18 which can bond permanently to the substrate 11 and a layer 19 which bonds weakly to a second substrate (not shown) so that the latter can be temporarily held on the substrate 11. A clean edge 20 is formed when the film is torn after the desired length is applied to the substrate. Either one, but preferably both, of the adhesive film layers include the alginic acid.

SPECIFIC EXAMPLES

The following examples are illustrative of the invention.

EXAMPLE 1

97 g of a 60% aqueous adhesive dispersion based upon a copolymer of butyl acrylate with methyl methacrylate in a ratio of 40:1 is dissolved in 10 g of water with 1 g of alginate (sodium or potassium) supplied by the Firm Grinstedt, the dispersion further containing 3 g of Ethylan BCP, a wetting agent from the Firm Macros. The resulting mixture, stirred with a blade stirrer is brought to a pH of 3 by the addition of 20% citric acid solution. As a result, alginic acid precipitates out in finely divided form and is dispersed by the stirrer throughout the adhesive dispersion. The adhesive dispersion is applied by a doctor blade in an amount of 40 g/m² to a siliconized paper carrier having a thickness of 40 micrometers. The dispersion is dried by evaporation of water at about 100° C. with contact with hot air. The adhesive film is applied to paper by means of a conventional hand roller of the type described. Repeated tests show a sharp edged tearing of the adhesive film.

EXAMPLE 2

Example 1 is followed with the following deviations: The aqeous adhesive dispersion is applied to a siliconized paper carrier with a thickness of 30 micrometers which has previously been formed with a coating of 5 g/m² of polymerized carboxylated ethylhexylacrylate.

The resulting adhesive film, also showing a sharp edged tear, was detachable from the substrate and can be used effectively as a label adhesive.

We claim:
1. An adhesive transfer tape comprising
   (a) a flexible carrier; and
   (b) an adhesive film applied to said flexible carrier and capable of separating from said flexible carrier and adhering to a substrate and of cleanly tearing without leaving adhesive threads, said adhesive film consisting essentially of:
   a pressure-sensitive adhesive which is a copolymer of methyl methacrylate mixed with butyl acrylate containing from about 0.5 to 10% by weight of alginic acid, in finely divided form, said adhesive film prepared by the steps of:
   (i) mixing an aqueous dispersion of an acrylate-based adhesive with an alginate dissolved in water to form an aqueous mixture;
   (ii) stirring the resulting aqueous mixture;
   (iii) acidifying the aqueous mixture to a pH of about 2 to 3 under stirring to obtain alginic acid, and precipitating the alginic acid in finely divided form to obtain an alginic acid-containing aqueous dispersion;
   (iv) applying the alginic acid-containing aqueous dispersion, prepared according to steps (i), (ii) and (iii) to the flexible carrier in an amount of 10 to 80 g/m², in terms of the dry substance content of the dispersion; and
   (v) drying the alginic acid-containing aqueous dispersion applied to the flexible carrier by evaporating water therefrom by contacting the aqueous dispersion with air heated to a temperature of 100° C. to form the adhesive film.

* * * * *